July 19, 1932. E. SAINTE-CLAIRE-DEVILLE 1,868,078
BRAKING DEVICE FOR CINEMATOGRAPHIC SPOOLS
Filed April 19, 1929 2 Sheets-Sheet 1

Inventor
Etienne Sainte-Claire-Deville
By Mauro & Lewis
Attorneys

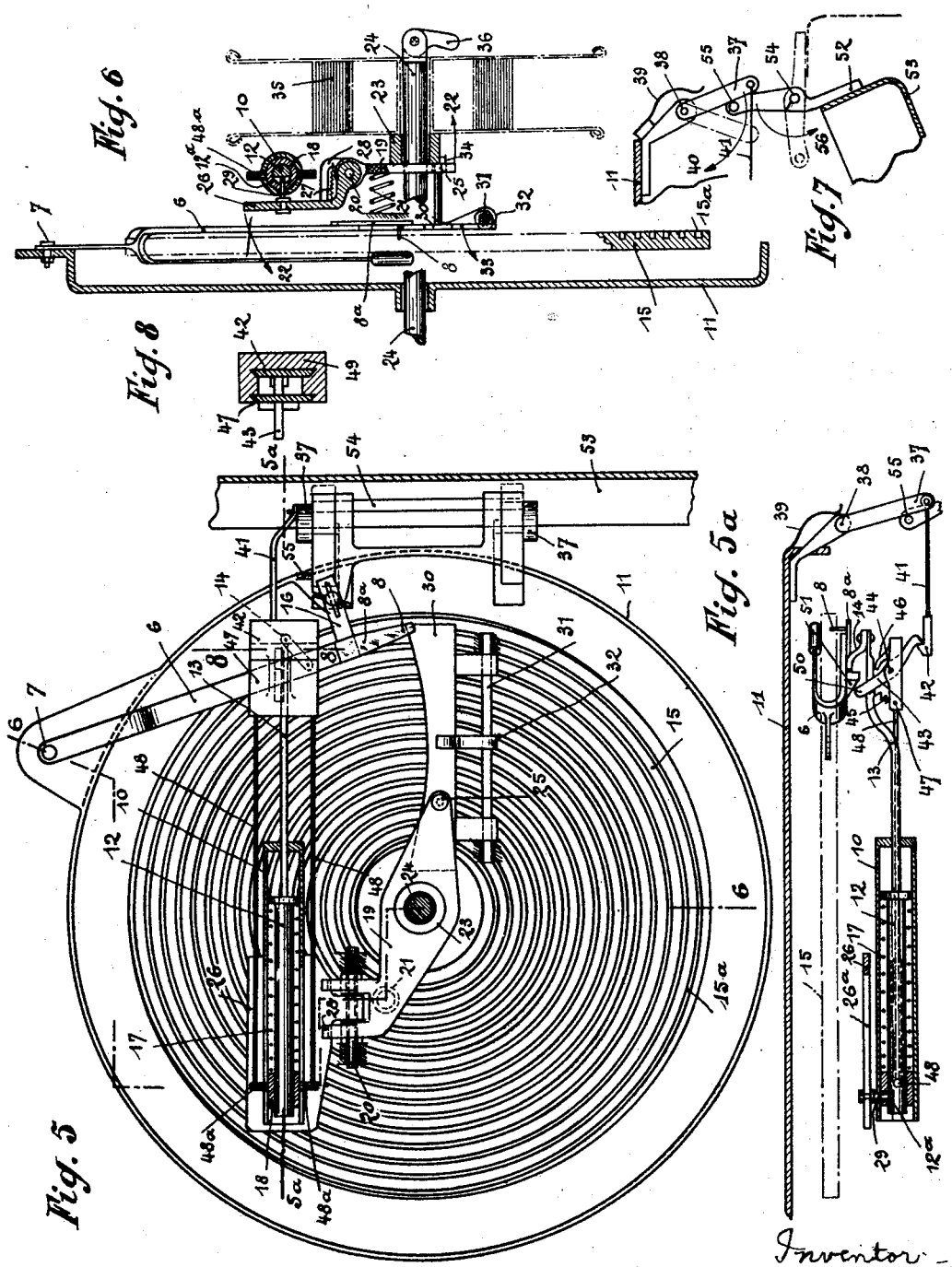

Patented July 19, 1932

1,868,078

UNITED STATES PATENT OFFICE

ETIENNE SAINTE-CLAIRE-DEVILLE, OF PARIS, FRANCE, ASSIGNOR TO SOCIETE DES ETABLISSEMENTS GAUMONT, OF PARIS, FRANCE, A CORPORATION OF FRANCE

BRAKING DEVICE FOR CINEMATOGRAPHIC SPOOLS

Application filed April 19, 1929, Serial No. 356,584, and in France May 12, 1928.

In the apparatus for cinematographic projections, the film is usually disposed at the upper part upon a slightly braked spindle and the supply or feed is secured by means of a toothed cylinder which pulls the film by means of perforations. At the beginning, when the spool has a large diameter, the tensile strain on the film is comparatively small but the same increases according as the diameter of the spool decreases and is comparatively large when the spool is almost entirely unwound. Inversely, at the moment the rewinding operation takes place at the lower part of the apparatus, the tensile strain on the film is very strong at the beginning and then gradually decreases so as to be what it ought to be; that is to say is just as required at the end of the rewinding operation. The result is that the wear of the perforations is somewhat a large one and that the film can pass but in a relatively small number of times through the projecting apparatus, the film having thereafter to be thrown away.

The braking device used in connection with cinematographic spools and forming the object of the present invention has for its purpose to avoid this inconvenience and to allow a relatively constant tensile strain on the film when the same enters the apparatus, this strain being adjustable according to the requirements.

The said device essentially consists in a plate driven by the spool in its revolving motion the said plate being subjected to a friction of constant intensity by means of a clasp with adjustable tightening action which enters into a groove provided in the plate and whose shape is that of an Archimedean spiral so that whilst the film winds or unwinds itself, the torque acting upon the spool remains proportional to the instantaneous diameter of the spool; that is to say the tensile strain on the film will remain constant.

The invention has also for its purpose a subduing device combined with the above described braking device and allowing to render its operation entirely automatic and to secure particularly on the one hand, at the beginning of the unwinding operation of the spool, the correct positioning of the clamping or tightening clasp and, on the other hand, at the end of the unwinding operation, the return of the said clasp to its starting position.

To this purpose, the articulated lever carrying the clamping or tightening clasp or claw is subjected to the action of a compressing spring which is tightened when the cover of the storing case for the spool is being closed after the said spool has been placed in position and which upon opening said cover will untighten so as to send back the lever into its original position.

However, for preventing the finger or pointer carried by the clasp, which follows the spiral groove on the plate, to exert, under the influence of the compressed spring, a detrimental reaction upon the walls of said groove, a special automatic locking device has been provided for limiting the compression of the spring to a constant value and for placing the same during the operation in a condition of static balance in which it will not exert any action upon the lever; the said action being exclusively started at the end of the unwinding operation for the purpose of returning the lever to its original position.

The following description made with reference to the accompanying drawings, given by way of example, will allow easy understanding of the way in which the invention is carried out.

Upon the storing case or magazine adapted to contain the film spool and generally known as fire protecting case, is mounted the mechanism which is shown in Figures 5, 5ª, 6, 7 and 8.

Figure 5 shows a case or magazine in front view the cover being open.

Figure 6 shows diagrammatically in a broken section, the profile of a part of the mechanism of the Figure 5.

Figs. 5ᵃ and 7 show diagrammatically in section on line 5a—5a of Fig. 5 and in plan view parts of the mechanism of Fig. 5.

Fig. 8 is a section on the line 8—8 of Fig. 7.

Figure 1:
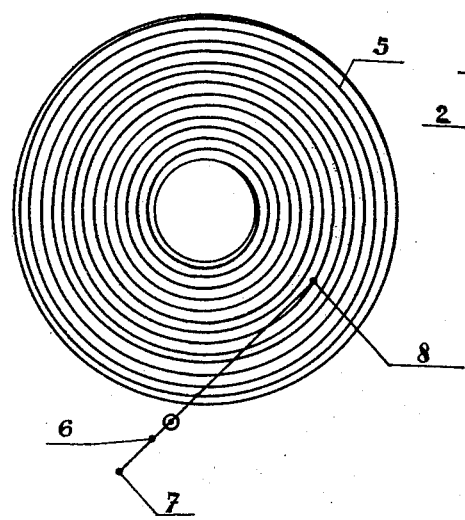
Figure 1 shows in a diagram the plate with the spiral provided thereon as well as the clamping or tightening clasp.
Figure 2:
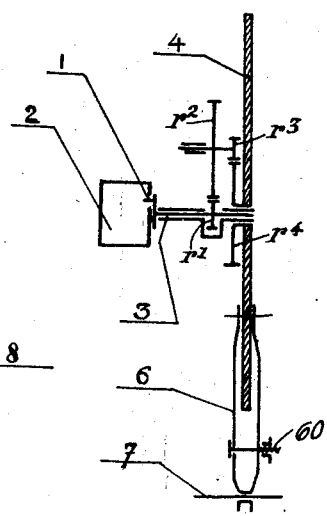
Figure 2 is a section made through the axis of the core of a spool to which is adjoined a braking plate in case the spool is driven by the rotary motion exerted upon the film.

In Figures 1 and 2, the upper spool-holding axis or spindle 3 is provided with a finger 1 connecting together during the revolution the spool 2 and the spindle 3.

A set of gears $r^1$ $r^2$ $r^3$ $r^4$ having the required ratio connects the spool-holding spindle 3 and the plate 4. The said plate is provided with a groove in the form of a spiral 5 in which the distance between two consecutive windings or coils, calculated according to a radius, is equal to the mean thickness of the film multiplied by the ratio of the set of gears. Therefore the said spiral is substantially an Archimedean spiral. Moreover, the direction of the radii increasing upon the said spiral is the same as the one in which the film is wound. A clasp 6, with elastic adjustable tightening action articulated at 7, follows through the medium of a pin 8 the groove 5, the clamping or tightening action of the clasp 6 being adjusted by means of a screw 60 according to the tension which it is desired to give to the film. The operation is as follows:

The pin of the clasp or claw 6 is placed at the same distance from the axis or spindle as the periphery of the spool. During the unwinding of the spool, if the ratio of the set of gears has been judiciously selected, the pin always remains at the same distance from the axis as the periphery of the spool, and the unwinding of the film requires a tractive effort which is always substantially equal to the frictional resistance exerted by the clasp, the constant and comparatively little important frictions of the set of gears being neglected.

Figure 3:
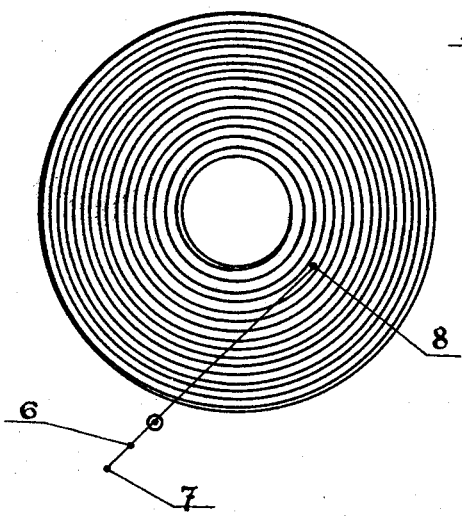
Figures 3 and 4 are views similar to Figs. 1 and 2 respectively illustrating the case where the rotary motion of the spool is directly transmitted to its axis.
Figure 4:
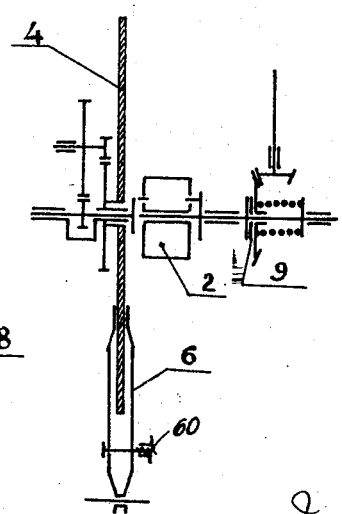

In the case shown in Figures 3 and 4, the principle of the first device has been applied to the rewinding of the film.

The frictional system 9 which is usually employed for securing the rewinding operation is maintained, but is adjusted in such manner that it will be able to drive in its revolving motion both the spool 2 carried by the spindle and the grooved plate 4 on which is provided the clasp with elastic adjustable tightening or clamping action. In this case, at the start of the rewinding operation, the point at which the clasp will be applied will be at a distance from the center equal to the radius of the spool when said spool is completely wound, and will be closer to the center when the winding operation has come to an end. In the absence of a braking action, the strain transmitted to the film through friction, would be at the beginning of the winding operation greater than at the end of the latter, for the same reasons as those which have been hereinbefore mentioned; if at the beginning of the winding operation, the clasp 6 is placed at the same distance from the axis or spindle as the periphery of the spool which is supposed to be wound, the driving motion of the core will be braked and accordingly the pulling or tensile strain of the core upon the film will be reduced. The said braking strain is regularly decreasing from the beginning to the end of the winding operation and it will be easy to adjust the value or power of friction of the clasp so that the resulting pulling strain exerted upon the film will be practically a constant one.

If the use of these devices is particularly desirable in connection with projecting apparatus, the same can just as well be applied to printing and developing apparatus, and the like.

In the projecting apparatus in which the film is continuously in motion, it presents a still greater advantage, such an arrangement assisting together with the principle of continuous unwinding in avoiding every cause of damage to the perforations of the film, whatever may be the number of passes through the apparatus.

The subduing device combined with the above described braking device and allowing to render its operation entirely automatic may be executed as follows:

Within a cylinder 10 secured to the body of the magazine or storing case 11 (Figures 5 and 6) is slidably mounted a piston 12 connected through a rod 13 and a small link 14 with the lever 6. This lever 6 which is articulated to a pivot 7 secured to the body of the storing case carries at one end a blade 8ᵃ acting as a spring and to which is riveted a finger 8. The lever 6 is fork-shaped as hereinabove described and clamps between its arms or branches a plate 15 driven together with the spool and provided with an Archimedean spiral groove 15ᵃ in which the finger 8 is engaged. The stroke of the lever 6 towards the right is limited by an adjustable stop 16 and towards the left by the spiral groove of the plate 15. The piston 12 is spring-loaded in a permanent manner by a compression spring 17 which bears, on the one hand, upon the left face of the piston, tending to push the latter towards the right and on the other hand, upon an abutment-collar 18 adapted to be bound with the lever 6 at the moment the cover 53 of the storing-case 11 is being closed by means of a special locking mechanism which will be hereinafter described; so that the compression of the spring 17 remains constant during any normal movement of the lever 6 from the right to the left, except in case of the interference of an extraneous intentional power, as hereinafter indicated.

A lever 19 of a special form with a double pallet is pivoted to an axis 20 rigidly secured to the storing case in a manner that has not been shown in the drawings in order not to unnecessarily complicate them, said lever 19 being normally parallel with the bottom of said casing. The said lever 19 tends to rock in the direction of the arrows 22, under the influence of a compression spring 21. The lever 19 carries, upon its lower pallet, a sleeve 23 which slides upon the spool-carrying spindle 24. Moreover, said pallet is provided with a hole 25. Said lever 19 comprises an upper pallet 26 which is not rigidly secured thereto, but yieldingly due to a tension spring 27 the action of which is however limited by a stop 28 secured to the lever 19. Said upper pallet 26 carries in a slot 26ª which is perpendicular to the plan of Figure 6, a finger 29 which remains engaged in a hole of the cylinder 10 parallel with the slot 26ª and in a hole of the socket 18, and can be either engaged in a recess 12ª provided in the rod of the piston barrel 12, or disengaged from the said recess. This system of finger, of perforations and recess forms the special locking device providing for connection between the lever 6 and the hereinbefore mentioned stop 18. In fact, it will be easily understood that when the finger 29 engages the recess 12ª of the rod of piston 12, on the one hand, the stop 18 is bound with the piston 12 by means of the finger 29 and that, on the other hand the lever 6 is bound with said stop through the medium of the rod 13, the piston 12 and the finger 29. The spring 17 is thus maintained in a condition of static balance between the piston 12 and the stop 18 which are stationary relatively to one another and said spring has no action whatever upon the lever 6; this action of spring 7 on the lever 6 can only take place when at a determined moment, the finger 29 is disengaged from the recess 12ª thereby releasing the piston from the stop 18.

In this manner, during the unwinding of the spool the finger 8 of the lever 6 is prevented from exerting a detrimental reaction upon the edges of the groove provided in the plate 15 which would be the case if said finger were constantly pushed toward the right by spring 17, whilst said spring 17 is kept compressed and is capable of acting at a given moment upon the lever 6.

Another single-pallet lever 30 is pivoted upon an axis 31 in parallel relation with the axis 20. This lever 30 is influenced by a twisting spring 32 which acts in the direction of the arrow 33. To said lever 30 is secured a finger 34 having a shoulder and engaged in the hole 25 of the lever 19. The spring 32 is just sufficient to secure the contact of said shoulder with the lower pallet of the lever 19, but cannot cause said lever 19 to rock.

The shoulder on said finger 34 is used for driving the lever 30 in the rocking motion of the lever 19 along the arrows 22.

The lever 30, through the right end of its pallet (Figure 5) bears upon the spring blade 8ª forming an extension of the lever 6, in such a manner that in the rocking motion of the lever 19 along the arrows 22, the finger 8 is disengaged from the spiral groove in the plate 15.

The spool 35 (Figure 6) is mounted upon the spindle 24 whose knuckle arm 36 is folded down thereby maintaining the spring 21 in a compressed condition through the medium of the sleeve 23.

A lever 37 (Figure 7) pivoted upon an axis 38 secured to the stationary part or bottom of the storing case 11 is influenced by a spring 39 in the direction of the arrow 40. At the end of the lever 37 is coupled through the medium of the small link 41 a hooked slide 42 which keeps in engagement with a rocking lever 43 pivoted at 44. This lever can rock under the influence of a compression spring 45 as far as a stop 46, and is pivotally mounted on a second slide 47.

Said slide 47 is connected through rods 48 and arms 48ª with the stop 18 (Figure 5). Both slides 42 and 47 are guided in a frame 49 (Figure 8) secured to the bottom of the magazine 11. At a certain moment of the displacement of slides 42 and 47 toward the right, when cover 53 is being closed, the end 50 of the rocking lever 43 comes in contact with a slope 51 provided on the lever 6, (Figures 5 and 7) and rises along the latter thus disengaging slide 47 from slide 42.

A lever 52 (Figure 7) is secured to the cover 53 of the magazine, said cover being pivoted upon the hinge 54. At the end of the lever 52 is provided a finger 55 which, in the movement of the lever, meets and drives the lever 37. The opening of the storing case has for its effect to drive the levers 37 and 52 along the arrows 40 and 56.

Such a subduing device being mounted upon each of the storing cases in a cinematographic apparatus, the operation will be as follows:

The operator places the adjustable stop 16 according to the length of the spool film he is going to mount on the upper spindle and folds down the knuckle-part 36, this resulting in forcing the sleeve 23, against the spring 21 and in stretching the spring 27 which will act upon the lever in the reverse direction of the arrows 22 as soon as the finger 29 lies opposite the recess provided in the piston 12. The lever 30 is urged in the direction of the arrow 33 and the finger 8 carried by the flexible blade 8ª engages the spiral groove or will engage as soon as it will be exactly opposite the same.

Upon closure of the cover 53, the lever 52 drives the lever 37 through the medium of the finger 55 thereby determining a shifting motion of the slides 42 and 47 towards the right until the lever 43 raising along the slope 51 of the lever 8 will disengage the lever 43 from the slide 42 which move out towards the right until the case or magazine be completely closed. But the pull of the slide 47 has been transmitted meanwhile through the rods 48 to the stop 18 which has moved along the piston rod thus compressing the spring 17 and driving along the finger 29 which can slide in the slot 26ª and in the elongated hole of the cylinder 10 until the said finger will be opposite the recess 12ª of the piston rod and enters the latter thereby connecting the lever 6 to the stop collar 18, as above indicated. The stop 18 is then connected to the piston 12 through the medium of finger 29, and will accompany the same towards the left, during all the time the apparatus is in operation.

Should it happen that, for any reason, the operator would open the storing case, during the operation, according to the position of the lever 6 at this moment, the slide 42 can cause the lever 43 to rock just to a sufficient extent to allow the hook to pass, then upon closure of the storing case, the hook of the slide 42 will drive the slide 47 for a very short moment until the end 50 of the lever 43 has ascended the slope 51, thereby disengaging the lever 43 from the hook of the slide 42 and the opening of the case will in no respect affect the different parts of the mechanism.

For the purpose of starting the winding of the film upon the rewinding spindle, the same operations will be performed in the same sequence.

When the projection is finished, the operator withdraws the spool after swinging up the knuckle-part 36. The spring 21 is free to push on lever 19, which rotates in the direction of arrows 22, whereby the finger 29 will be disengaged from the recess 12ª of the piston rod, liberating said piston which, under the action of the spring 17, will force the lever 6 (Figure 5) to the right as far as the stop 16; during that stroke, the piston compresses the air contained in the space of the cylinder 10 situated behind the piston 12 for the purpose of absorbing the shock consequent to the lever 6 coming into contact with the stop 16.

Back movement of the lever 6 is made possible by the fact that owing to the rotation of lever 19 the finger 8 has been simultaneously disengaged from the spiral groove by the lever 30, which is rotated toward the right through its finger 34.

The various parts therefore assume the same positions as when the apparatus was loaded.

The stop 16 is adjustable so as to allow a conscientious operator to work with an ever constant tension of film; whatever may be the length of the spool film, if care is taken to secure the said stop in a position corresponding to the periphery of the spool which is to be unwound.

In case the said stop would remain stationary the only disadvantage resulting therefrom would be a tension of the film slightly stronger in the unwinding and a little more slack upon rewinding when dealing with spools having small film lengths.

What I claim is:

1. In a braking device for the spools of cinematographic projection apparatus, a plate provided with a spiral groove, means for causing the plate to rotate simultaneously with the spool, a clasp pivoted on a fixed point and adapted to frictionally engage said plate, and means adapted to cooperate with the spiral groove for guiding the free end of the clasp upon the plate.

2. In a device for braking the spools of cinematographic projection apparatus, a plate provided with a spiral groove, means for causing the plate to rotate simultaneously with the spool, a clasp pivoted on a fixed point and adapted to frictionally engage said plate, a finger upon said clasp adapted to follow the groove provided in the plate and means for varying the clamping action of the clasp upon the plate.

3. In a device for braking the spools of cinematographic projection apparatus, a plate provided with a spiral groove, a set of gears interposed between the said plate and the spool, a clasp pivoted on a fixed point, and adapted to frictionally engage said plate, a finger on said clasp adapted to follow the groove, and means for varying the clamping action of the clasp upon the plate.

4. In a device for braking the spools of cinematographic apparatus, a plate provided with a spiral groove a set of gears and a friction driving mechanism for causing the plate to rotate simultaneously with the spool at a suitable ratio of rate, a clasp pivoted on a fixed point and adapted to frictionally engage said plate, a finger on said clasp adapted to follow the groove, and means for varying the clamping action of the clasp upon the plate.

5. In a device for braking the spools of cinematographic apparatus, a plate provided with a spiral groove, means for causing said plate to rotate simultaneously with the spool, a clasp pivoted on a fixed point and adapted to frictionally engage said plate, a finger on said clasp adapted to follow the groove of the plate, means for varying the clamping action of the clasp upon the plate and means for returning the clasp to its original position at the end of the revolution of the spool.

6. In a device for braking the spools of cinematographic projection apparatus, a film magazine, a cover rotatably mounted on said magazine, a spindle adapted to receive a spool of film, a plate adapted to be driven by said spindle and provided with a spiral groove, a clasp pivotally mounted on the magazine and adapted to frictionally engage said plate, a finger on said clasp adapted to engage the spiral groove of the plate, and means combined with the cover of the magazine for returning the clasp to its starting position when the cover of said magazine is open at the end of the revolution of the spool, and the spool is removed from the spindle.

7. In a device for braking the spools of cinematographic projection apparatus, a film magazine, a cover rotatably mounted on said magazine, a spindle adapted to receive a spool of film, a plate adapted to be driven by said spindle and provided with a spiral groove, a clasp pivotally mounted on the magazine and adapted to frictionally engage said plate, a finger on said clasp adapted to engage the spiral groove of the plate, a cylinder mounted on the magazine, a piston in said cylinder, a slidable stop in said cylinder, a spring interposed between the piston and the slidable stop, a rod for connecting the piston to the clasp, a system of articulated levers connected to the cover for moving said stop so as to compress said spring at the beginning of the operation, when the cover is closed, means adapted to lock the stop on the piston in this position, and a system of pivoted levers for releasing said locking means when the cover is open at the end of the operation and the spool is removed from the spindle whereby the piston is pushed by the spring, thus returning the clasp to its starting position.

In testimony whereof I have signed this specification.

ETIENNE SAINTE-CLAIRE-DEVILLE.